(12) United States Patent
Neystadt et al.

(10) Patent No.: US 9,111,079 B2
(45) Date of Patent: Aug. 18, 2015

(54) TRUSTWORTHY DEVICE CLAIMS AS A SERVICE

(75) Inventors: Eugene (John) Neystadt, Kfar-Saba (IL); Daniel Alon, Tel Mand (IL); Yair Tor, Shorashim (IL); Mark Novak, Newcastle, WA (US); Khaja E. Ahmed, Bellevue, WA (US); Yoav Yassour, Zikhron Yaakov (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

(21) Appl. No.: 13/015,180

(22) Filed: Jan. 27, 2011

(65) Prior Publication Data

US 2012/0084851 A1    Apr. 5, 2012

Related U.S. Application Data

(60) Provisional application No. 61/388,433, filed on Sep. 30, 2010.

(51) Int. Cl.
| | |
|---|---|
| G06F 7/04 | (2006.01) |
| G06F 21/33 | (2013.01) |
| G06F 21/57 | (2013.01) |
| H04L 29/06 | (2006.01) |

(52) U.S. Cl.
CPC ............. *G06F 21/335* (2013.01); *G06F 21/57* (2013.01); *H04L 63/10* (2013.01); *G06F 2221/2129* (2013.01); *H04L 63/0807* (2013.01); *H04L 63/0876* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 7,591,017 B2* | 9/2009 | Watkins et al. | 726/24 |
| 8,271,780 B2* | 9/2012 | Xiao et al. | 713/156 |

(Continued)

FOREIGN PATENT DOCUMENTS

| | | |
|---|---|---|
| CN | 101127645 A | 2/2008 |
| CN | 101242267 A | 8/2008 |
| EP | 1990750 A1 | 11/2008 |

OTHER PUBLICATIONS

"International Search Report", Mailed Date: Feb. 28, 2012, Application No. PCT/US2011/051655, Filed Date: Sep. 14, 2011, pp. 8.

(Continued)

*Primary Examiner* — Jason K. Gee
*Assistant Examiner* — Olanrewaju Bucknor
(74) *Attorney, Agent, or Firm* — Aneesh Mehta; Kate Drakos; Micky Minhas (57) ABSTRACT

Embodiments of the invention make the issuance of trustworthy device claims available to client devices as a service, so that a client device to which device claims are issued may use the device claims in relation to an attempt to access a network application. The service may conduct an assessment of the device's characteristics and/or state, characterize the results of this assessment in device claims, and issue the device claims to the device. The service may be accessible to a client device from outside administrative boundaries of an entity that makes a network application accessible, and thus may be useful to entities making network applications accessible in business-to-consumer (B2C) and business-to-business (B2B) topologies, such as over the publicly accessible Internet.

20 Claims, 5 Drawing Sheets

(56) References Cited

U.S. PATENT DOCUMENTS

| | | | |
|---|---|---|---|
| 8,630,620 B2* | 1/2014 | Cha et al. | 455/411 |
| 8,881,257 B2* | 11/2014 | Cha et al. | 726/10 |
| 2003/0070091 A1 | 4/2003 | Loveland | |
| 2004/0221045 A1 | 11/2004 | Joosten et al. | |
| 2005/0071630 A1* | 3/2005 | Thornton et al. | 713/156 |
| 2005/0076202 A1* | 4/2005 | Thornton et al. | 713/156 |
| 2005/0138417 A1* | 6/2005 | McNerney et al. | 713/201 |
| 2005/0289347 A1 | 12/2005 | Ovadia | |
| 2007/0143629 A1* | 6/2007 | Hardjono et al. | 713/189 |
| 2007/0192864 A1* | 8/2007 | Bryant et al. | 726/23 |
| 2009/0327497 A1 | 12/2009 | Itshaki et al. | |
| 2009/0328186 A1 | 12/2009 | Pollutro et al. | |
| 2010/0043066 A1* | 2/2010 | Miliefsky | 726/9 |
| 2010/0058432 A1 | 3/2010 | Neystadt et al. | |
| 2010/0077445 A1* | 3/2010 | Schneider et al. | 726/1 |
| 2010/0115578 A1 | 5/2010 | Nice et al. | |
| 2010/0251334 A1* | 9/2010 | Xiao et al. | 726/3 |
| 2011/0179477 A1* | 7/2011 | Starnes et al. | 726/9 |
| 2011/0191579 A1* | 8/2011 | Xiao et al. | 713/156 |
| 2012/0023568 A1* | 1/2012 | Cha et al. | 726/10 |
| 2012/0054843 A1* | 3/2012 | Horman et al. | 726/7 |

OTHER PUBLICATIONS

About the Statement of Health (SoH) in Network Access Protection, © 2010 Microsoft Corporation, Accessed Jun. 28, 2010, 3 pages; http://technet.microsoft.com/en-us/library/bb680833(printer).aspx.

Solutions & Products—Compecta™ IT Consulting & Integration Services, Accessed Jun. 28, 2010, 6 pages; http://www.compecta.com/s_p/system/sss/microsoft_ss.aspx.

Computer Health Check System—Cisco Clean Access (CCA) Network Access Control at American University, Accessed Jun. 28, 2010, 1 page; http://www.american.edu/oit/network/CCA.cfm.

Cloud Computing and Security—A Natural Match—Trusted Computing Group™, Apr. 2010, 5 pages.

"IP Security Features, Intel Ethernet Server Adapters and Microsoft Windows Server 2008", technical white paper, 2009, 12 pages.

"First Office Action and Search Report in China Patent Application No. 201110308693.7", Mailed Date: Nov. 5, 2013, Filed Date: Sep. 29, 2011, 12 Pages (5 pages English translation and 7 pages original Chinese Office action).

"Second Office Action received for China Patent Application No. 201110308693.7", Mailed Date: Jun. 18, 2014, 7 Pages.

"Notice of allowance received for China Patent Application No. 201110308693.7", Mailed Date: Sep. 30, 2014, 4 Pages.

* cited by examiner

TRUSTWORTHY DEVICE CLAIMS AS A SERVICE

CROSS-REFERENCE TO RELATED APPLICATION

This application claims priority under 35 U.S.C. §119(e) to U.S. provisional patent application Ser. No. 61/388,433, entitled "Trustworthy Device Claims as a Service," filed on Sep. 30, 2010, the entirety of which is incorporated herein by reference.

BACKGROUND

Many organizations seek to offer users the ability to transparently access applications from any location, using any device, at any time. Providing users this level of access involves overcoming a number of obstacles, including those relating to security. For example, organizations may seek to provide different levels of user access to applications and/or data depending on each user's role and/or relationship to the organization.

SUMMARY

Commonly assigned U.S. patent application Ser. No. 12/822,724, entitled "Network Layer Claims Based Access Control," filed Jun. 24, 2010, discloses techniques that provide flexibility with respect to making access control decision at the network layer of the OSI stack, through the use of information provided in "claims" (also known to those skilled in the art as "assertions"). Briefly, claims may include information on any of numerous attributes of a computer requesting access to a resource, the circumstances surrounding the requested access, the resource to which access is requested, and/or other information. In accordance with disclosed techniques, the information provided in claims may be evaluated in light of one or more access control policies, and used in deciding whether to grant or deny access to a particular network resource. Because the information provided in claims may be more detailed than that which was previously used to make access control decisions at the network layer, policies may be more flexibly formulated, and may take into account information of varied natures or types.

Commonly assigned U.S. patent application Ser. No. 13/015,202, entitled "Trustworthy Device Claims for Enterprise Applications," filed concurrently herewith, discloses techniques whereby an application may be provided information, in claims form, describing the characteristics and/or state of a device requesting access to the application. These claims describing the characteristics and/or state of a device are hereinafter referred to as "device claims." An application to which device claims are provided may employ the information therein to drive any of numerous types of functionality, including security- and non-security-related functionality. For an example, device claims may be used by an application to drive access control decisions, verify that the described device satisfies certain criteria before making certain functionality or data available, generate output suited to the device's characteristics, etc. In accordance with disclosed techniques, the device undergoes a remote attestation process through which device claims are generated and then converted to a form which the application is configured to consume. The device claims may then be included by the device in a request to access the application. As a result of being generated via the remote attestation process, the device claims are accepted by the application as an accurate, genuine representation of the device's characteristics and/or state.

Embodiments of the present invention make the issuance of trustworthy device claims available to devices as a service. In this respect, Applicant has appreciated that in certain instances, an entity that makes an application available over a network (e.g., via the publicly accessible Internet) may find value in the information that device claims may provide (e.g., an independent assessment of the characteristics and/or state of a device requesting access), but may not wish to incur the administrative and cost overhead associated with issuing device claims to devices that seek access to the application. Accordingly, some embodiments of the present invention provide a service from which a device may obtain device claims which may then be used in relation to attempts to access network applications. The service may conduct (e.g., perform and/or oversee) an independent assessment of the device's characteristics and/or state, characterize the results of this assessment in device claims, and provide the device claims to the device for use in subsequent attempts to access an application. In some embodiments, the service may be accessible to a device from outside administrative boundaries of the entity that makes a network application available. As such, embodiments of the invention may be useful to parties making network applications accessible to devices in business-to-consumer (B to C) and business-to-business (B to B) topologies.

The foregoing is non-limiting summary of embodiments of the invention, which are defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In accordance with some embodiments of the invention, a service is provided from which a device may obtain device claims for use in relation to attempts to access a network application. In some embodiments, in response to a device's attempt to access a network application, the device may be provided an indication of one or more device state token services (DSTSs) that are trusted, by the network application and/or the device, to conduct an independent assessment of the device's characteristics and/or state, and to issue an accurate and genuine representation, in the form of device claims, of the device's characteristics and/or state. Once issued to the device by the DSTS, the device claims may be used by the device in relation to attempts to access the network application, and used by the network application to drive security- and non-security-related functionality.

Figure 1:
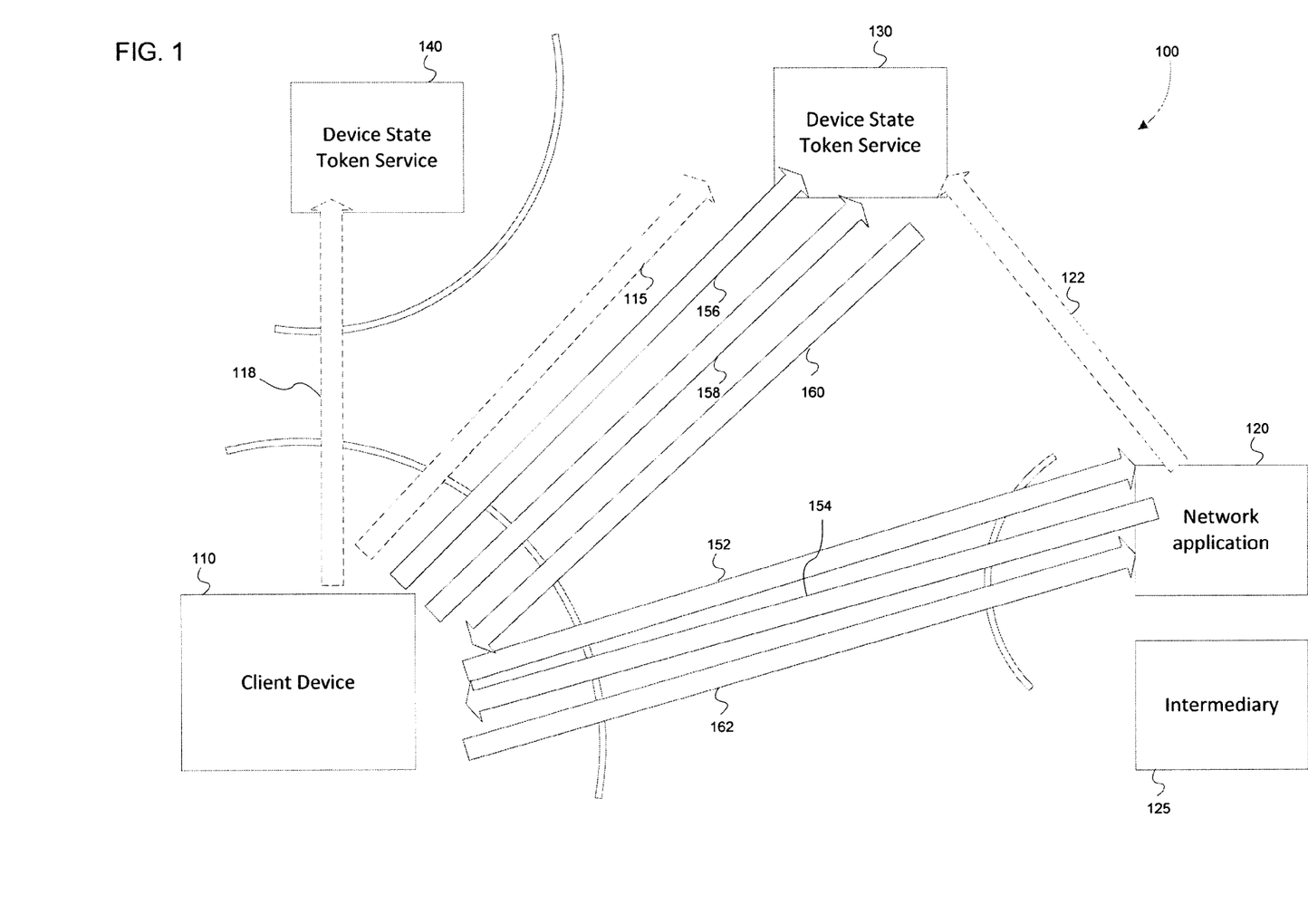
FIG. 1 is a block diagram depicting a system in which trustworthy device claims may be issued to a client device, in accordance with some embodiments of the invention.

An example system comprising components for issuing trustworthy device claims to a device, and an example procedure through which these components may interact, is depicted in FIG. 1. In the example shown, client device 110 (which may be any suitable computing device, such as a desktop or laptop computer, mobile telephone, personal digital assistant, content reproduction device, television, gaming console and/or any other suitable device type) communicates with network application 120 (which may comprise any one or more application components) via one or more networks (not shown in FIG. 1). The one or more networks may facilitate communication according to any one or more suitable communications protocols, and comprise any suitable communications infrastructure. The one or more networks may, for example, comprise the publicly accessible Internet.

Figure 2:
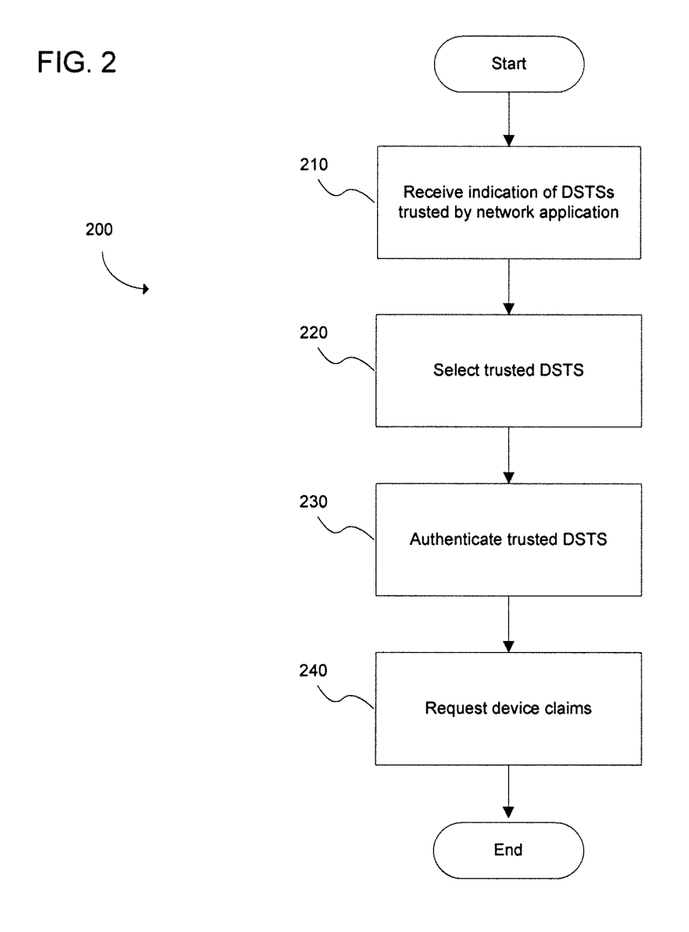
FIG. 2 is a flowchart depicting an example process whereby a client device receives from a network application a list of trusted device state token services and selects a trusted DSTS, in accordance with some embodiments of the invention.

The example procedure depicted in FIG. 1 begins with an attempt by client device 110 to access to network application 120, as indicated by arrow 152. Network application 120 may respond to this access attempt in any of numerous ways. In the example depicted in FIG. 1, network application 120 responds by providing client device 110 with an indication (e.g., list) of one or more DSTSs which network application 120 trusts to issue trustworthy device claims, indicated by arrow 154. Client device 110 may then select a DSTS which it also trusts to conduct the assessment. An example process 200 whereby a client device receives from a network application an indication of one or more DSTSs trusted to issue device claims, and selects a DSTS from which to request the device claims, is depicted in FIG. 2.

At the start of process 200, client device 110 receives in act 210 an indication of one or more DSTSs trusted by network application 120 to perform an independent assessment of the client device's characteristics and/or state, and to issue device claims characterizing same. In the example shown in FIG. 1, network application 120 has a trust relationship with DSTS 130 (indicated by arrow 122), but not with DSTS 140.

Process 200 then proceeds to act 220, wherein client device 110 selects a DSTS from which to request device claims. For example, client device 110 may select from the list provided by network application 120 a DSTS which it also trusts. Trust may be preferable given the invasive nature of some assessments performed by a DSTS in the process of issuing device claims. A DSTS may be trusted by client device 110 because of a pre-existing trust relationship, because the DSTS satisfies one or more criteria, or for any other reason(s). In the example depicted in FIG. 1, client device 110 has a pre-existing trust relationship with DSTS 130 (indicated by arrow 115) and DSTS 140 (indicated by arrow 118). (It should be appreciated that although only two DSTSs are depicted in FIG. 1, any suitable number of DSTSs may be provided.) Given that DSTS 130 is included on the indication received in act 210, in this example, client device 110 selects DSTS 130 as the DSTS from which to request device claims.

Process 200 then proceeds to act 230, wherein client device 110 authenticates selected DSTS 130. Authentication of DSTS 130 may, for example, prevent a malicious actor from posing as DSTS 130 to gain unfettered access to information and/or functionality on client device 110. In some embodiments, client device 110 may authenticate DSTS 130 by evaluating an X.509 certificate issued by DSTS 130 for this purpose, or using any other suitable means of authentication.

Process 200 then proceeds to act 240, wherein client device 110 requests device claims, and then completes.

It should be appreciated that the process of FIG. 2 is merely one example procedure whereby a client device may identify a DSTS from which to request device claims. For example, the indication provided to client device 110 in act 210 need not include only DSTSs trusted by network application 120, and may include DSTSs trusted by both network application 120 and client device 110. It should also be appreciated that embodiments of the invention are not limited to implementations wherein a client device selects a DSTS at all. For example, upon receiving an access request from client device 110 (indicated by arrow 152 in FIG. 1), network application 120 may simply redirect client device 110 to a DSTS which it trusts to issue accurate device claims. Embodiments of the invention may be implemented in any of numerous ways.

It should also be appreciated that the example process shown in FIG. 2 may be supplemented to include acts (e.g., performed by client device 110) if a suitable DSTS from which to request device claims can not be identified. Any of numerous operations may be performed if a suitable DSTS can not be identified. For example, client device 110 may present information to a user relating to locating a suitable DSTS, client device 110 may query network application 120 to obtain information relating to locating a suitable DSTS, and/or one or more other operations may be performed. Embodiments of the invention are not limited to any particular implementation.

At the completion of the example process of FIG. 2 (i.e., after client device 110 requests device claims), DSTS 130 (FIG. 1) responds to the request for device claims by providing device state policies and scripts to client device 110. In some embodiments, the information obtained from DSTS 130 may instruct client device 110 on information to be collected to support the issuance of device claims to client device 110.

Scripts provided by DSTS 130 to client device 110 may, when executed by client device 110, assist in collecting some or all of this information. An example technique whereby information relating to a client device is collected to support issuance of device claims is described in commonly assigned U.S. Provisional Application Serial No. 61/388,433, entitled "Trustworthy Device Claims as a Service," filed Sep. 30, 2010, some portions of which are reproduced herein. In embodiments disclosed therein, a data collection component on client device 110 (not shown in FIG. 1) communicates with one or more data sources to collect information specified by DSTS 130. For example, the data collection component may provide information to the data source(s), and receive from each data source information indicative of device characteristics and/or state. For example, the data collection component may provide contextual information to a data source, relating to a state of the client device at or after the occurrence of any of numerous events during the device's life cycle (e.g., a reboot of its operating system, a resumption from hibernation/sleep, installation of one or more drivers of software patches, initiation of network connectivity, a location change, and/or other event(s)). A data source may in turn provide information on the "health" of client device 110 (e.g., whether it is equipped with security and/or anti-virus software, whether certain (e.g., security) software is activated, whether the client device employs a firewall, whether the firewall is operational, whether anti-virus signatures are up-to-date, etc.), the type of cryptography used by client device 110 to access applications (e.g., whether signing and/or encrypted communications are used, the type of encryption, etc.), an identifier for client device 110, a role which client device 110 performs (e.g., as a desktop computer, database server, web server, etc. its owner (e.g., a company, employee, vendor, etc.), a geographic location of client device 110, and/or any of numerous other types of information. The information provided may be "signed" by a data source to attest to its accuracy.

In addition to the data source(s) described above, client device 110 may also receive information from a locally implemented trusted platform module (TPM) component (not depicted in FIG. 1). A TPM may perform any of a number of functions relating to the generation of device claims, including logging events in its Platform Configuration Registers (PCRs); allowing cryptographic keys to be generated, stored and used; allowing "quotes" over a data construct called the "TCG log" to be generated to attest to the trustworthiness of events reported in that log to a remote party; maintain a "boot counter" that can be used to differentiate successive boot cycles and provide additional security measures spanning hibernate/restart events; and/or other functions.

The information collected is then provided to DSTS 130, as indicated by arrow 158. DSTS 130 may then preliminarily evaluate the information provided by client device 110 to determine whether device claims should be issued. For example, DSTS 130 may validate TPM measurements to validate that they were not modified after generation, determine whether client device 110 is free of malware, and/or perform other preliminary assessments. If a preliminary determination is made that claims generation should commence, then DSTS 130 may further evaluate information received from client device 110 to determine the specific device claims that should be generated. This determination may be driven, at least in part, by policies implemented by DSTS 130 governing the device claims that should be generated based on the information received. Device claims that are generated are signed by DSTS 130, and then sent to client device 110, as indicated via arrow 160. Device claims may be sent to client device 110 using any suitable delivery vehicle. For example, some embodiments provide for device claims to be included in a Security Assertion Markup Language (SAML) token sent to client device 110. However, any suitable vehicle(s) for device claims may be employed.

In some embodiments, the information that is sent to client device 110 includes an indication of the client device's identity, so as to bind the device claims to the client device. The binding may prevent a malicious actor from misappropriating the device claims and posing as client device 110 to gain access to network application 120. Binding may be accomplished using any suitable technique, such as via the issuance of an X.509 certificate by DSTS 130.

Upon receiving the device claims, client device 110 attempts to access network application 120, as indicated by arrow 162. For example, a browser application executing on client device 110 (not shown in FIG. 1) may include the device claims in a request to access network application 120. Of course, client device 110 is not limited to employing a browser application to access network application 120, as any suitable technique(s) and/or component(s) may be used to attempt access to network application 120.

Figure 3:
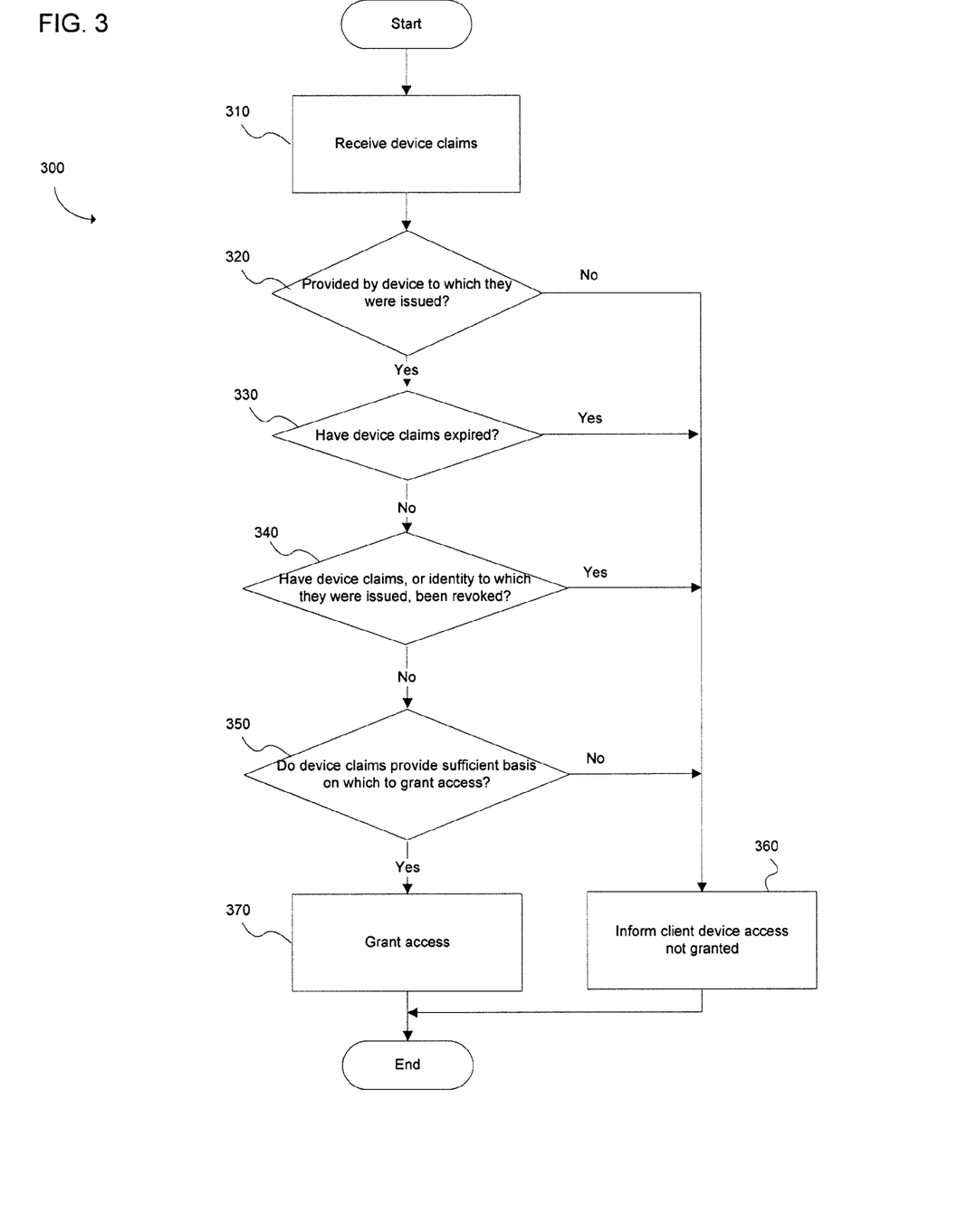
FIG. 3 is a flowchart depicting an example process whereby a network application evaluates device claims submitted by a client device, in accordance with some embodiments of the invention.

Network application 120 may then evaluate the device claims received from client device 110. An example process 300 by which evaluation may be performed is depicted in FIG. 3.

At the start of process 300, network application 120 receives the device claims in act 310. In act 320, network application 120 determines whether the device claims were provided by the device to which they were issued. This step may be performed to prevent a malicious actor from posing as a particular device in attempting access to the network application. Verification that the device claims were provided by the device to which they were issued may be performed in any of numerous ways. In some embodiments, network application may validate the device claims by examining an X.509 certificate that was issued by DSTS 130 to bind the device claims to the client device, as described above.

If network application 120 is unable to verify that device claims were provided by the device to which they were issued, then process 300 proceeds to act 360, wherein the network application informs the client device that access is not granted. Process 300 then completes.

Conversely, if network application 120 verifies that the device claims were provided by the device to which they were issued, then process 300 proceeds to act 330, wherein network application 120 determines whether the device claims have expired. In this respect, while a client device may employ a given set of device claims in connection with multiple attempts to access a network application, in some embodiments device claims may have a prescribed expiration (e.g., a certain number of hours after issuance, and/or some other condition-based expiration). For example, since device claims may be contextual in nature (e.g., they may relate to a device's state, its physical location, whether the client device has certain software patches installed, etc.), their accuracy may become questionable some time after issuance.

If network application 120 determines that the device claims (or a subset thereof) have expired, process 300 proceeds to act 360, wherein the network application informs the client device that access is not granted. Network application 120 may, for example, inform client device 110 that new device claims should be obtained. Process 300 then completes.

If network application 120 determines that the device claims have not expired, then process 300 proceeds to act 340, wherein a determination is made whether the device claims, or the client identity to which a binding for the device claims has been established, has been revoked. In this respect, device claims may be revoked by a DSTS and thus may become ineffective before they expire, for any of numerous reasons. For example, a change in policy implemented by a DSTS, a change in a client device's state and/or characteristics, or any other reason(s) may cause a DSTS to revoke device claims. A client's identity (e.g., specified via a certificate issued with device claims) may also be revoked, causing any device claims that were issued to that identity to become ineffective.

A determination whether a client device's identity and/or device claims have been revoked may be performed in any of numerous ways. In one example, the network application may query the DSTS that issued the device claims to the client device (in the example shown in FIG. 1, DSTS 130) to verify that the client device's identity and/or device claims have not been revoked using the Online Certificate Status Protocol (OCSP), or any other suitable protocol(s) or technique(s).

If network application 120 determines in act 340 that the device claims, or the client identity to which a binding for the device claims has been established, has been revoked, process 300 proceeds to act 360, wherein the network application informs the client device that access is not granted. In some embodiments, the network application may instruct the client device that a new set of device claims should be obtained. Process 300 then completes.

If network application 120 determines in act 340 that the device claims and client identity have not been revoked, then process 300 proceeds to act 350, wherein a determination is made whether the device claims provide sufficient basis on which to grant access. This determination may be based on any of numerous factors. For example, network application 120 may determine that the device claims are insufficient because one or more predetermined criteria are not satisfied by information in the device claims. For example, a particular claim may be missing (e.g., indicating that antivirus software is not installed, that malware executes on client device 110, etc.), one or more claim values may be unsatisfactory (e.g., indicating that a certain security patch is missing and/or that a particular security measure, such as a BitLocker, is not activated on client device 110), and/or the predetermined criteria are not satisfied for other reasons. Network application 120 may evaluate the information provided in device claims in any of numerous ways to determine whether they provide a sufficient basis on which to grant access.

If the device claims do not provide a sufficient basis on which to grant access, process 300 proceeds to act 360, wherein network application 120 informs the client device that access has not been granted. Network application 120 may, in some embodiments, instruct client device 110 and/or its user on how to remedy the deficiency. For example, network application 120 may instruct client device 110 to present an indication of a reason why access was not granted to its user, so that the user may assist with remediation. In this respect, client device 110 may include programmed logic for obtaining information that may help the user remediate the deficiency. For example, if the information received from network application 120 is technical in nature (e.g., is expressed in terms of an error code that may not be easily understandable by the user), then client device 110 may retrieve (e.g., by querying a DSAP server) information that is more easily understandable. This information may include, for example, instructional text, a URL for a site with additional information, etc. For example, text may be presented to the user to instruct him/her on installing a most recent antivirus patch that the DSTS expects to be installed, etc., so that the user may take action to remediate a deficiency with the device claims. It should be appreciated, however, that not all embodiments of the invention rely on the user to take action to remediate a deficiency. For example, in some embodiments client device 110 may execute programmed logic for automatically remediating a deficiency. Embodiments of the invention may be implemented in any of numerous ways.

At the completion of act 360, process 300 then completes.

If it is determined in act 350 that the device claims provide sufficient basis on which to grant access, then process 300 proceeds to act 370, wherein access is granted. Process 300 then completes.

Referring again to FIG. 1, upon granting access to client device 110, network application 120 may process the device claims. Such processing may involve using the information in the device claims to perform any of numerous functions, including security- and non-security-related functions. For example, information in device claims that describes the characteristics or capabilities of client device 110 may be used by network application 120 to drive specific application functionality, to tailor output to suit those characteristics or capabilities, etc. Embodiments of the invention are not limited to using the information provided in device claims in any particular manner.

In some embodiments, the example process of FIG. 1 may be altered somewhat, in that a client device may not communicate directly with a network application, but may instead communicate with the network application through an intermediary. In this respect, FIG. 1 depicts access gateway 125 which, in some embodiments, may communicate with client device 110 to, for example, receive the request from client device 110 to access network application 120 (discussed above as indicated by arrow 152), responding to the access request (discussed above as indicated by arrow 154), and/or receiving device claims from client device 110 (discussed above as indicated by arrow 162).

An intermediary such as an access gateway may be useful, for example, in situations where network application 120 does not support or is otherwise not appropriately configured to process device claims. For example, Applicant has appreciated that some legacy network applications may not be capable of processing device claims, and that the reconfiguration necessary to enable this capability may involve significant investment by the entity that makes the network application available. Thus, an intermediary may provide a "claims-enabled" front-end for network application 120 to process information provided in device claims.

Processing by an intermediary may include performing any of numerous functions, including but not limited to those relating to security. As one example, an intermediary may process device claims to make access control decisions, and pass on to network application 120 only information from client devices that are granted access. As another example, an intermediary may pre-process device claims to transform them into a form which the network application is configured to consume, so that the application may then use the information in performing certain functions. Those skilled in the computer programming art may envision numerous uses for an intermediary in the example system of FIG. 1, and embodiments of the invention are not limited to any particular implementation. Some example implementations employing an intermediary, and functions performed thereby, are disclosed in commonly assigned U.S. patent application Ser. No. 12/822,745, entitled "Trusted Intermediary For Network Layer Claims-Enabled Access Control," filed Jun. 24, 2010, which is incorporated by reference in its entirety.

As noted above, a client device could potentially obtain device claims from any of multiple DSTSs, such as ones with which the client device and/or network application have a trust relationship. To prevent inconsistency in policies used by each DSTS in issuing device claims, some embodiments of the invention provide a consistent policy scheme to which each DSTS subscribes. For example, in some embodiments, all device claim issuance policies may be such that one DSTS may place more restrictive requirements on a client device than other DSTSs, but no DSTS implements a policy which a client device can satisfy only by violating a policy implemented by another DSTS. For example, one DSTS may be prevented from requiring that in order for particular device claims to be issued, a client device should not have software patches installed within the previous week, while another DSTS dictates that a client device may only have a certain number of days of missing software patches for device claims to be issued. In some embodiments, policy conflict is avoided by expressing conditions in additive terms, although embodiments of the invention are not limited to in this respect, as any suitable scheme(s) may be employed, or none at all if policy consistency is not a priority. p It should be appreciated that, although the example system of FIG. 1 employs a DSTS to perform the processing associated with providing device claims to a client device, embodiments of the invention are not limited to such an implementation. Any one or more suitable components, which may or may not include a DSTS, may alternatively be employed. For example, as described in above-referenced commonly assigned U.S. patent application Ser. No. 13/015,202, entitled "Trustworthy Device Claims for Enterprise Applications," portions of the processing associated with generating and issuing device claims may be performed by an attestation server. Other embodiments may not employ a DSTS at all, and may employ other components to generate and/or issue device claims. Any suitable configuration of components may be employed, as embodiments of the invention are not limited in this respect.

Figure 4:
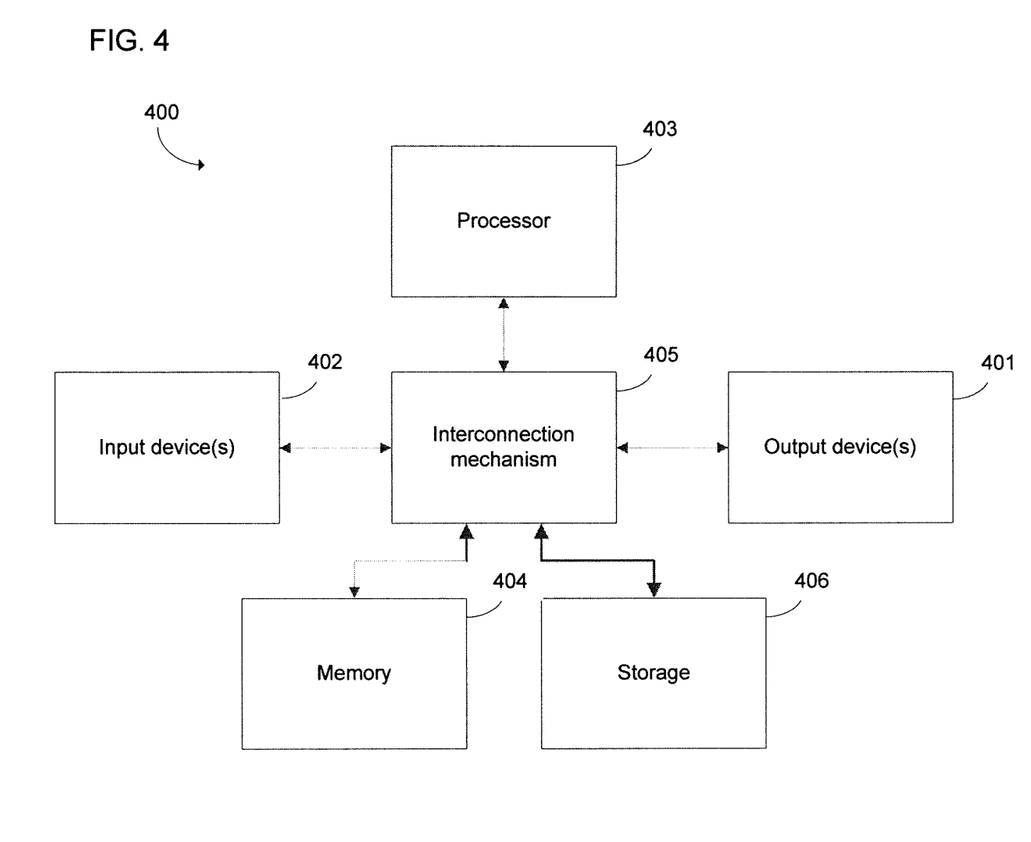
FIG. 4 is a block diagram depicting an example computer system on which embodiments of the invention may be implemented.

Various aspects of the systems and methods for practicing features of the invention may be implemented on one or more computer systems, such as the exemplary computer system 400 shown in FIG. 4. Computer system 400 includes input device(s) 402, output device(s) 401, processor 403, memory system 404 and storage 406, all of which are coupled, directly or indirectly, via interconnection mechanism 405, which may comprise one or more buses, switches, networks and/or any other suitable interconnection. The input device(s) 402 receive(s) input from a user or machine (e.g., a human operator), and the output device(s) 401 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 403 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Processor 403 may also execute one or more computer programs to implement various functions. These computer programs may be written in any type of computer program language, including a procedural programming language, object-oriented programming language, macro language, or combination thereof. These computer programs may be stored in storage system 406. Storage system 406 may hold information on a volatile or non-volatile medium, and may be fixed or removable. Storage system 406 is shown in greater detail in FIG. 5.

Figure 5:
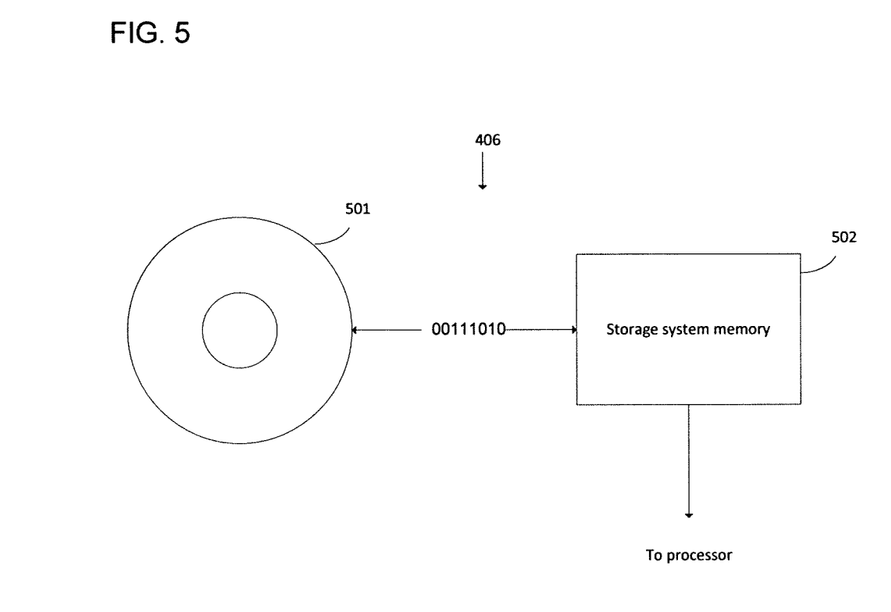
FIG. 5 is a block diagram depicting an example memory on which instructions embodying aspects of the present invention may be stored.

Storage system 406 may include a tangible computer-readable and -writable non-volatile recording medium 501, on which signals are stored that define a computer program or information to be used by the program. The recording medium may, for example, be disk memory, flash memory, and/or any other article(s) of manufacture usable to record and store information. Typically, in operation, the processor 403 causes data to be read from the nonvolatile recording medium 501 into a volatile memory 502 (e.g., a random access memory, or RAM) that allows for faster access to the information by the processor 403 than does the medium 501. The memory 502 may be located in the storage system 406 or in memory system 404, shown in FIG. 4. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited to any mechanism, whether now known or later developed. The invention is also not limited to a particular memory system 404 or storage system 406.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in a system comprising a network application and a client device, the method comprising acts of:
   receiving, by a device state token service that has a trust relationship with the network application, a notification from the network application, the notification indicating that the client device attempts to access the network application;
   providing, by the device state token service, a request for information to the client device in response to receiving the notification;
   receiving, by the device state token service, information from the client device describing a characteristic and/or state of the client device in response to the request, the device state token service also having a pre-existing trust relationship with the client device, the pre-existing trust relationship indicating that the client device trusts the device state token service to issue device claims to the client device;
   processing the information to generate first device claims, which describe at least one of one or more characteristics of the client device or a state of the client device, to be issued to the client device; and
   issuing the first device claims to the client device.

2. The method of claim 1, wherein the receiving the notification is in response to the client device being redirected to the device state token service, after a request by the client device to access the network application.

3. The method of claim 1, wherein the providing the request comprises:
   providing, by the device state token service, a policy and/or script usable by the client device to collect the information; and
   wherein the receiving the information comprises:
      receiving a result generated via execution of the policy and/or script, the result comprising information generated by a trusted platform module (TPM) component on the client device.

4. The method of claim 1, further comprising:
   establishing a binding between the generated first device claims and the client device.

5. The method of claim 1, further comprising, prior to receiving the information, the device state token service responding to a request issued by the client device to authenticate the device state token service.

6. At least one computer-readable storage device having instructions encoded thereon which, when executed by a client device in a system comprising the client device and a network application, perform a process comprising:
   requesting access to the network application;
   receiving an indication of a plurality of device state token services trusted by the network application to issue device claims;
   selecting, from among the plurality of device state token services, a device state token service with which the client device has a pre-existing trust relationship, the pre-existing trust relationship indicating that the client device trusts the device state token service to issue device claims to the client device;

communicating a request to the device state token service to issue device claims describing a characteristic and/or state of the client device;

receiving a request for information from the device state token service in response to communicating the request to the device state token service; and providing information to the device state token service describing at least one of one or more characteristics of the client device or a state of the client device in response to receiving the request for information.

7. The at least one computer-readable storage device of claim 6, wherein selecting the device state token service comprises selecting, from among the plurality of device state token services, the device state token service based on the device state token service satisfying predetermined criteria.

8. The at least one computer-readable storage device of claim 6, further comprising, prior to requesting access to the network application:

receiving a response to a request, which is issued by the client device to authenticate at least one of the plurality of device state token services, from the at least one of the plurality of device state token services.

9. The at least one computer-readable storage device of claim 6, further comprising, in response to providing the information to the device state token service, receiving issued device claims; and employing the issued device claims in connection with a request to access the network application.

10. The at least one computer-readable storage device of claim 9, wherein receiving issued device claims comprises:

receiving issued device claims that include a binding between the issued device claims and the client device.

11. The at least one computer-readable storage device of claim 6, wherein receiving the request for information comprises:

receiving a script from the device state token service in response to communicating the request to the device state token service; and wherein the process further comprises:

executing the script to collect the information describing the at least one of the one or more characteristics of the client device or the state of the client device.

12. The at least one computer-readable storage device of claim 6, wherein selecting the device state token service comprises selecting, from among the plurality of device state token services, the device state token service with which the client device has a pre-existing trust relationship based on the client device having the pre-existing trust relationship with the device state token service.

13. A system, comprising:

one or more processor circuits; and storage coupled to the one or more processor circuits via an interconnection mechanism, the storage configured to store instructions that are executable by the one or more processor circuits, the one or more processor circuits configured to execute the instructions to perform operations comprising:

provide a notification to a device state token service by a network application or an intermediary interposed between a client device and the network application in response to the client device attempting to access the network application, the notification indicating that at least one device claim is to be provided to the client device;

receive from the client device one or more device claims in response to the notification being provided to the device state token service, the one or more device claims describing at least one of a characteristic of the client device or a state of the client device;

determine that the one or more device claims are effective and authentic, and that the one or more device claims were issued to the client device by the device state token service with which the client device has a pre-existing trust relationship, the pre-existing trust relationship indicating that the client device trusts the device state token service to issue the one or more device claims to the client device;

when it is determined that the one or more device claims are effective and authentic, evaluate the one or more device claims to determine whether access to a network application should be granted to the client device; and when it is determined that access should be granted, grant the client device access to the network application.

14. The system of claim 13, wherein the network application is configured to include at least one of the one or more processor circuits.

15. The system of claim 13, wherein the intermediary is configured to include at least one of the one or more processor circuits.

16. The system of claim 13, wherein at least one of the one or more processor circuits is configured to execute instructions to determine that the device claims have not expired to determine that the one or more device claims are effective and authentic.

17. The system of claim 13, wherein at least one of the one or more processor circuits is configured to execute instructions to determine that the device claims have not been revoked to determine that the one or more device claims are effective and authentic.

18. The system of claim 17, wherein at least one of the one or more processor circuits is configured to execute instructions to determine that an identity of the client device has not been revoked to determine that the one or more device claims are effective and authentic.

19. The system of claim 17, wherein at least one of the one or more processor circuits is configured to execute instructions to query the device state token service to determine that the one or more device claims are effective and authentic.

20. The system of claim 13, wherein at least one of the one or more processor circuits is configured to execute instructions to, when it is determined that access should not be granted, instruct the client device on steps to take for access to be granted by providing information to the client device relating to remediating a deficiency in the device claims causing it to be determined that access should not be granted.

* * * * *